Patented Aug. 17, 1926.

1,596,594

UNITED STATES PATENT OFFICE.

MELVIN DE GROOTE, OF ST. LOUIS, AND WILBUR C. ADAMS, OF UNIVERSITY CITY, MISSOURI, ASSIGNORS TO WM. S. BARNICKEL & COMPANY, OF WEBSTER GROVES, MISSOURI, A CORPORATION OF MISSOURI.

PROCESS FOR TREATING PETROLEUM EMULSIONS.

No Drawing. Application filed October 1, 1925. Serial No. 59,953.

This invention relates to the treatment of emulsions of mineral oil and water, such as petroleum emulsions, for the purpose of separating the oil from the water.

Petroleum emulsions are of the water-in-oil type and comprise fine droplets of natural occurring waters or brines dispersed in a more or less permanent state throughout the oil which constitutes the continuous phase of the emulsion. They are obtained from producing wells and from the bottom of oil storage tanks and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion to the action of a condensation product containing a poly-cyclic, aromatic and a soap-forming material, together with a sulphonic group or groups, in such a manner that the emulsion will "break" and separate into its component parts of oil and water or brine when the emulsion is permitted to remain in a quiescent state after treatment.

In practising our process a treating agent of the kind mentioned is brought into contact with the emulsion either by introducing the treating agent into a well in which a petroleum emulsion is being produced; introducing the treating agent into a conduit through which a petroleum emulsion is flowing; introducing the treating agent into a tank in which a petroleum emulsion is stored, or introducing the treating agent into a container that holds a sludge obtained from the bottom of an oil storage tank. The treating agent can even be introduced into a producing well in such a way that it will become mixed with water and oil that is emerging from the ground before said water and oil enter the barrel of the well pump, or the tubing up through which said water and oil flow to the surface of the ground. After treatment the emulsion is allowed to stand in a quiescent state at a suitable temperature so as to permit the water or brine to separate from the oil, or it may be passed through a variety of apparatus, such as hay tanks, gun barrels, etc., such as are now commonly used in the operation of "breaking" petroleum emulsions. It may even be passed through a centrifugal or electrical dehydrator.

The specific class of poly-cyclic derivatives which we contemplate using are those containing a sulphonic group in one or more of the poly-cyclic rings or connected to the poly-cyclic rings through an intermediate radical, such as a hydrocarbon chain. Benzene is the basis of mono-cyclic chemistry. By the expression "poly-cyclic bodies", we desire to use the usually accepted terminology to denote aromatic hydrocarbons in which there is more than one ring. Therefore, in a general way, these compounds include the derivatives of naphthalene, anthracene and naphthacene, but we wish it to be understood that our process contemplates the use of organic derivatives in which poly-cyclic radicals are connected directly or indirectly with the sulphonic group or the salt or ester of a sulphonic group. We also wish it to be understood that our process is not limited to the use of derivatives obtained by a sulphonating action on the hydrocarbons themselves, for the action may take place on the hydroxy-derivatives, such as di-hydroxy-anthracene, or on the halogen derivatives, such as chloro-naphthalene, or on the nitro-derivatives, such as nitro-naphthalene.

We have not found it necessary that the sulphonic group be connected directly with the aromatic hydrocarbon or its derivatives. The sulphonic group can be introduced into an aliphatic hydrocarbon and this aliphatic hydrocarbon then joined with the aromatic hydrocarbon. For instance, ricinoleic acid can be sulphonated to give sulpho-ricinoleic acid. This material can be esterified with beta naphthol, thus giving beta naphthol sulpho-ricinoleate. Hence, the class of materials contemplated by our process may be considered as those having a poly-cyclic, aromatic hydrocarbon or its derivatives and one or more sulphonic groups, or the salts or esters of the sulphonic groups, and together with an organic, detergent-forming material.

There are certain organic groups which are recognized as being capable of forming detergents. These groups include the fats and fatty acids, the rosins and similar bodies, the petroleum acids, such as naphthenic acids and modifications of this same which bear simple genetic relationships to the parent group. In using our process compounds containing poly-cyclic, aromatic hydrocarbons, and one or more of these organic detergent groups together with the sulphonic group are used. Specific examples are naphthalene sulpho-ricinoleate, previously described, sulpho-hydroxyanthracene resinate, sulpho-naphthalene naphthenate, and naphthalene sulphonaphthenate. In other words, the class of materials contemplated by our process consists of a molecule containing a poly-cyclic, aromatic or its derivatives, an organic detergent group and a sulphonic group or groups. It is to be understood, of course, that ordinarily we prefer to use the salts, water soluble or water insoluble, or the esters of the molecule, rather than any corrosive acid.

Having thus described our invention, what we claim as new and desire to secure by Letters Patent is:

1. A process for treating petroleum emulsions, characterized by subjecting the emulsion to the action of a treating agent consisting of a condensation product containing a poly-cyclic, aromatic group, an organic detergent-forming group, together with a sulphonic group.

2. A process for treating petroleum emulsions, characterized by subjecting the emulsion to the action of a treating agent consisting of a condensation product containing a poly-cyclic, aromatic and a fatty material, together with a sulphonic group.

MELVIN DE GROOTE.
WILBUR C. ADAMS.